(12) United States Patent
Norrie

(10) Patent No.: US 7,756,014 B1
(45) Date of Patent: Jul. 13, 2010

(54) DEVICE AND METHOD FOR HANDLING CATASTROPHIC ROUTING

(75) Inventor: Christopher I. W. Norrie, San Jose, CA (US)

(73) Assignee: Integrated Device Technology, inc., San Jose, CA (US)

( * ) Notice: Subject to any disclaimer, the term of this patent is extended or adjusted under 35 U.S.C. 154(b) by 619 days.

(21) Appl. No.: 11/677,697

(22) Filed: Feb. 22, 2007

(51) Int. Cl.
*G01R 31/08* (2006.01)
(52) U.S. Cl. .................. 370/218; 370/244; 710/314
(58) Field of Classification Search ........... 370/218, 370/469, 471, 244; 710/305–315
See application file for complete search history.

(56) References Cited

U.S. PATENT DOCUMENTS

2006/0233199 A1* 10/2006 Harriman ............ 370/469

OTHER PUBLICATIONS

PCI Express Base Specification Revision 1.1, PCI, Mar. 2005.*

* cited by examiner

*Primary Examiner*—Steven H Nguyen
*Assistant Examiner*—Vinncelas Louis
(74) *Attorney, Agent, or Firm*—Michael R. Hardaway; Kenneth Glass; Glass & Associates

(57) ABSTRACT

A method and device for handling catastrophic switch routing errors. Upon receiving a communication packet in a packet switching device, a port in the switching device is matched with the destination address of the communication packet and a routing code is generated to direct routing of the communication packet internally to the packet switching device. The routing code is analyzed to determine whether a catastrophic routing condition exists in the routing code. If no catastrophic routing condition exists, the routing is executed. However, when there is a catastrophic routing condition, execution of the routing of the communication packet is prevented.

28 Claims, 4 Drawing Sheets

DEVICE AND METHOD FOR HANDLING CATASTROPHIC ROUTING

BACKGROUND OF THE INVENTION

Peripheral Component Interconnect (PCI) Express implements a serial, switched-packet, point-to-point communication standard at a system level. The basic PCI Express architecture includes a root complex, a PCI Express switch chip, and various external devices. Communication packets in PCI Express include but are not limited to transaction layer packets (TLP).

PCI Express switches decode inbound transaction layer packet (TLP) headers and use corresponding fields in configuration space Base Address Registers, Base/Limit registers, and Bus Number registers to apply address, identification (ID), and implicit routing coding to the packet. There are two levels of decision: the device first determines if the packet targets an internal location, meaning it is intended for the device itself; if not, and the device is a switch, it evaluates the packet to see if it should be forwarded out of an egress port. If the packet has been received in error or is not properly formed, it is handled as a receive error. There are a number of cases when this may happen, and a number of ways it may be handled.

In a PCI Express switch, three address routing methods use Base Address Registers (BARs), and base address matching, to determine how to route incoming packets. The configuration of each port includes three BARs for the three addressing modes. A BAR includes a base address and a limit address as well as bus and port identifiers. If the target address in the header of a transaction layer packet is within the range of a downstream port's base and limit registers, the transaction layer packet is routed toward that port. If the target address is outside of the range of the upstream port's base and limit registers, the packet is routed toward the upstream port. If neither of these conditions are met, the packet has no route and is considered an unsupported request. If multiple ports detect a range match, such as can happen with an erroneous configuration, the behavior of the switch is not defined. This is referred to as a catastrophic routing condition or as a catastrophic route.

A catastrophic route means there is no correct, unambiguous, answer to which port a TLP should be routed. A catastrophic route can occur due to a design error in the switch or by a configuration error in the base address registers and IDs. If a switch behaves unpredictably due to a catastrophic route, it is possible for damage from a programming error to propagate in an unpredictable way. For example, mis-configuring one downstream port during a complex dynamic reconfiguration of that port, due to a hot-plug event for example, has the potential to disrupt operations of the entire network in which the switch is implemented. One result of catastrophic routing can be a hang-up, or stoppage, of the switch. By stopping switch operation and not accepting or reading further incoming packets, the switch is unable to accept and read a reconfiguration packet from the root complex that would cure the underlying problem. The only cure, in some instances, is to power down and restart the switch, which sometimes means restarting the entire system, so that it can receive a fresh reconfiguration.

Thus, there is a need for a method and apparatus that will detect catastrophic routes in a serial packet switch and deal with them so as to prevent disruption of switch operations. The method and apparatus of the present invention corrects such occurrences without disrupting network operations.

SUMMARY OF THE INVENTION

A method and apparatus is disclosed herein for detecting and handling catastrophic routing in a PCI Express switch so as to prevent disruptions of switch operations. An embodiment of the method also logs such occurrences by the statistics mechanisms designed into the switch for alleviating or eliminating mis-programming or mis-configuring of a PCI Express switch.

A method and device for handling catastrophic switch routing errors is disclosed. The method includes analyzing a routing code in a packet switching device to determine whether a catastrophic routing condition exists, executing the routing of the communication packet if no catastrophic routing condition exists and preventing the execution of the routing of the communication packet if a catastrophic routing condition exists. The method can also include determining whether the catastrophic routing condition is correctable, nullifying the routing of the communication packet if the catastrophic routing condition is not correctable, correcting the routing code if the catastrophic routing condition is correctable and executing the corrected routing code.

By preventing execution of a catastrophic routing, embodiments of the present invention enable a switch that encounters a catastrophic route to continue operations without disruption. A potential cause of catastrophic routing is mis-configuration of base address registers in the switch. By continuing switch operations and notifying the PCI Express system root complex of the error, a mis-configured switch can be reconfigured properly, preventing repetition of the error.

These and other advantages of the present invention will become obvious to those of ordinary skill in the art after having read the following detailed description of the preferred embodiments, which are illustrated in the various drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
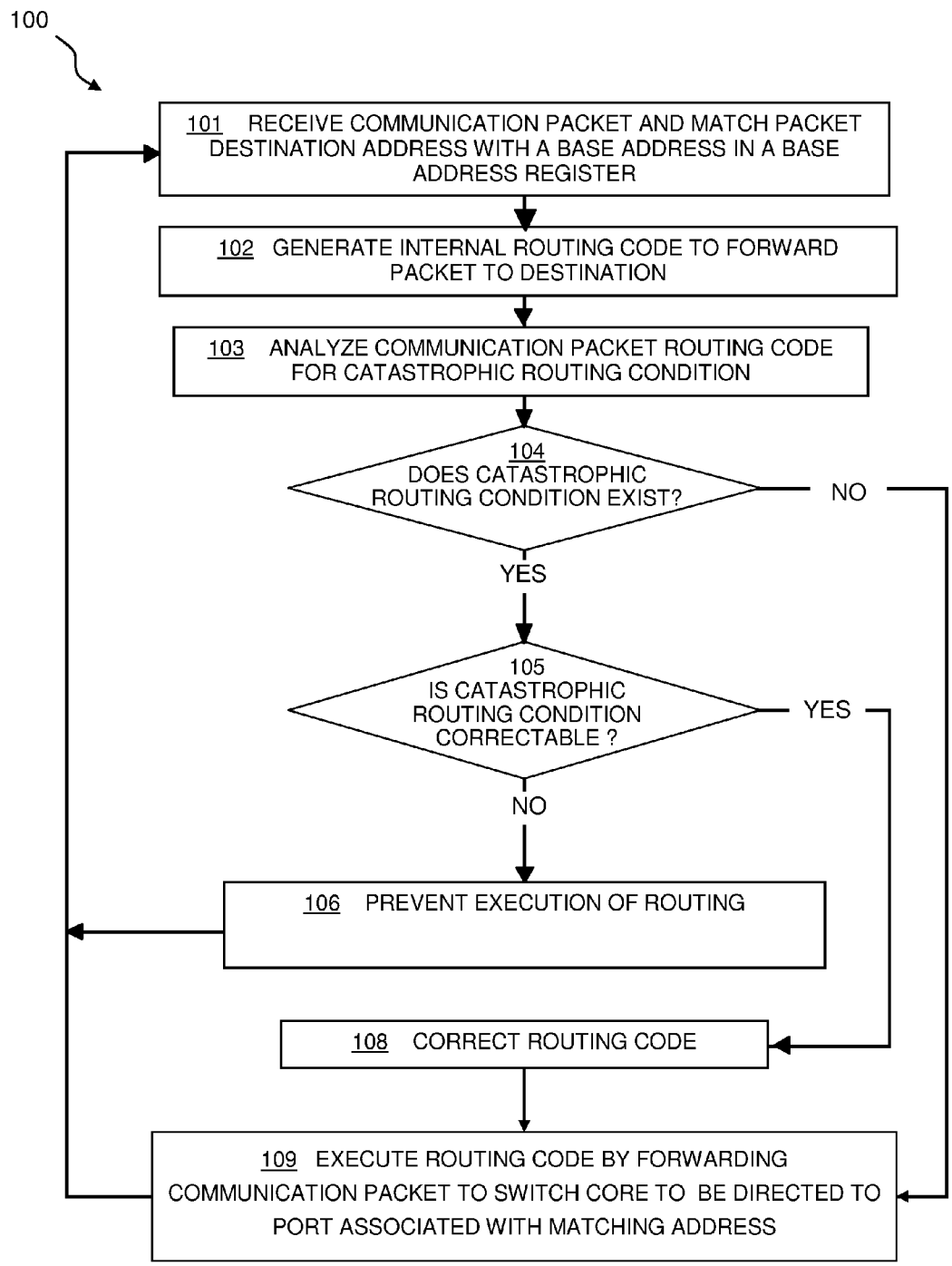
FIG. 1 illustrates a flow diagram of a method for detecting and handling catastrophic routing of communication packets in accordance with an embodiment of the present invention.

FIG. 1 illustrates a flow diagram of a method 100 for handling catastrophic routing errors in a multi-port switch, in accordance with an embodiment of the present invention. At step 101, a communication packet is received. In the present embodiment, the communication packet is received at an ingress port in a port of a PCI Express multi-port switch. In the present embodiment, the PCI express switch operates in accordance with PCI Express standards, including but not limited to PCI Express Standard versions 1.0, 1.0a, and 1.1 published by PCI Signal Interest Group (PCI-SIG), that are incorporated herein by reference in their entirety.

In the present embodiment, the communication packet is a transaction layer packet (TLP). A transaction layer packet (TLP) is a communications packet, in a PCI Express system, that has at least a body and a header. The TLP can also include a payload. The header contains the destination information that is used to forward the TLP to its ultimate destination. In PCI Express, the destination address can be a memory address, a pre-fetchable memory address or an I/O address, or a bus or device or function number.

It is noted here that a transaction layer packet can be of several types. One type is a TLP that transports data to be written into a memory location. The body of the packet contains the data to be written and the header contains a target address that defines the memory location. The header can also include an indication of the amount of data to be written so that logic can guarantee that there is sufficient memory at the targeted location. Another type of transaction layer packet is a command that instructs a switch to reconfigure its base address registers (BARs). In this example, the target address is the switch itself and the packet body contains the base and limit addresses to be written to the BARs.

It is noted that a base address register, as referred to in this description, denotes a register that holds a base address, a limit address, and a port identifier, either a port number or a port name. Since a bus number can also be used to route some types of packets in a PCI Express serial switch, a bus number can be included in the contents of a base address register.

PCI Express routing in a PCI Express switch, it is noted, is typically accomplished by a packet traversing from an ingress port to an egress port. The ingress port can be at any switch port that receives the communication packet. A routing destination egress port can be at any other switch port or at the same switch port. Valid routing can be from the upstream port to any of the downstream ports, as when the root complex sends a packet to an external device or from a downstream port to an upstream port. The routing can also be from a downstream port to an upstream port or from a downstream port to another downstream port, known as peer-to-peer routing. Another valid routing can be from a single ingress port to all other ports, sometimes called broadcast routing. Invalid routing is routing that does not conform to any of these types.

When a TLP is received, it is queried for a destination by reading the header which contains a destination address, a function identifier, a bus identifier, or another indication of destination. If the TLP header contains a destination address, the address is matched with a base address in a base address register associated with a port in the multi-port switch. One embodiment of base address matching is described in detail in U.S. patent application Ser. No. 11/395,715, filed Mar. 31, 2006, entitled "Binary Base Address Search Device and Method", and incorporated herein by reference.

At step 102 in FIG. 1, if a base address is found that matches the destination address in the TLP header, an internal routing code is generated by a routing code generator. The routing code is sent to the switch core of the multi-port switch to route the TLP through the switch to a port that is properly in the desired pathway. A routing code, in this embodiment, is a set of binary bits that indicate the proper pathway and/or port to the switch core.

At step 103, the routing code is analyzed to determine if a catastrophic routing condition exists. A catastrophic routing condition in the routing code means that the routing represented in the routing code, if executed, would cause a catastrophic route. This could cause a stoppage or unpredictable aberration in the operation of the multiport switch.

In the present embodiment, a catastrophic routing condition occurs, for example, when the routing code is generated to direct the TLP to more than one, but not all, of the ports in the packet switch. Routing to one port and routing to all ports are defined and supported in the PCI Express specification. Routing to some ports, but not all, is not defined and is not currently supported in PCI Express. Analysis of the routing code, at step 103 in FIG. 1, indicates whether the intended port is the sole intended port or if some, but not all, additional ports are indicated by the base address match.

A catastrophic routing condition can occur when one or more base address registers in a switch is mis-configured and overlapping address ranges exist in the BARs. When a target address in a packet HEADER matches more than one BAR, a routing code is generated that tries to send the packet to all of the matched ports. This produces an ambiguity of routing for the routing code and it is not supported in the PCI Express specification. If routing is encountered that is not supported in the defined PCI Express instruction set, the switch core can hang-up or stop, with no ability to bypass the stoppage.

A typical TLP destination address applies to one port only in a PCI Express switch. Occasionally, a TLP can be intended for all ports in a switch. This is accommodated by "broadcast" routing. In the undefined case where more than one port, but not all, detects a base address match, the switch can enter into a state in which it cannot decide what action to take but cannot move on to the next action; a catastrophe in terms of high speed switch operation. This multiple port routing that is not broadcast routing is a catastrophic routing condition.

Referring again to FIG. 1, if, at step 104, the routing represented in the routing code is not deemed to be a catastrophic routing condition, the routing code is executed by forwarding the TLP to the appropriate port, in accordance with the internal routing code, at step 109. Routing, or forwarding, the TLP to the appropriate port is defined in the PCI Express standard.

If, at step 104, a catastrophic routing condition is found to exist in the routing code, a further determination is made 105 as to whether the catastrophic condition in the code is correctable. An example of a correctable routing code is where two ports are indicated by the routing code because the two ports have overlapping address ranges in their respective BARs. If the limit address associated with the lower base address is higher than the higher base address, both ports can be indicated in the routing code. If it is determined that one port is configured in error, the error is avoided by correcting the catastrophic routing condition in the routing code at step 108.

Correcting routing code, in one embodiment, includes finding whether the address ranges in more than one port's BARs overlap. This can be caused by a configuration error. In one embodiment, correcting routing code entails changing the code to eliminate the undefined condition.

Once a potentially catastrophic routing is avoided by correcting 108 the catastrophic routing condition in the routing code, the corrected routing code is executed at step 109. Executing the routing code means that the TLP is forwarded to the switch core for direction to a port that properly lies in the path to the destination of the TLP.

If, at step 105, the catastrophic routing condition is not correctable, the TLP is either nullified, step 106, or treated as an unsupported request. In one embodiment, the determination is made by a bit in a register in the switch that is set on power up. Nullification of a TLP results in the packet being discarded and not forwarded. Nullification is, in this embodiment, a means by which potentially catastrophic routing is prevented.

When a communication packet is nullified, a notification is made of the nullification in accordance with the PCI Express specification. In one embodiment, the unsupported request notification of step 106 is accompanied by results of the analysis at step 103. In the case of the catastrophic routing condition in the code being caused by an address range overlap, the underlying cause of the error is a base address register configuration error. The results of the analysis enable the reconfiguration of the base address registers to correct the error.

An unsupported request designation is one method by which the switch can notify the root complex of an erroneously addressed TLP or of a configuration error in the base address registers associated with the ports in the switch. The notification provides a means of logging errors for subsequent correction of the configuration error.

If the address field within a TLP is uniquely within the range of a downstream port's base and limit registers, the TLP is routed toward that downstream port. If the address field within a TLP is outside of the range of the upstream port's base and limit registers, which span all the addresses associated with the downstream ports, the TLP is routed toward the upstream port. If neither of these conditions are met, the TLP has no route and is considered an unsupported request (UR). If multiple ports detect a range match, a configuration programming error is indicated and the behavior of the switch is not defined.

For example, the header of a TLP carrying data intended for a memory write operation typically has a target base address and an indication of the address space required to complete the write function with the data contained in the packet. The TLP is often received on the upstream port and routed to a downstream port. If the memory device to which the applicable base address applies has sufficient address space, as measured by the difference between the BAR's base address and its limit address, the TLP is assigned a routing code within the switch that routes it to the port and on down the chain to where the memory write operation takes place. If the address space is not sufficient, the TLP routing is an unsupportable request. Handling of a TLP with an unsupportable destination address is defined in the PCI Express standard.

Though the embodiment of FIG. 1 shows the routing code to be corrected when a catastrophic routing condition exists and the routing code is correctable, alternatively the execution of the routing of the communication packet is prevented, without determining whether it is correctable and with out [cin: without] correcting it. In this embodiment the method does not include steps 105 and 108, and each time that a catastrophic routing condition is determined to exist steps 106-107 are performed. More particularly, step 106 is performed so as to nullify the communication packet associated with the catastrophic routing condition. [cin: Alternatively] the communication packet is designated as an unsupported request as shown by step 107.

Figure 2:
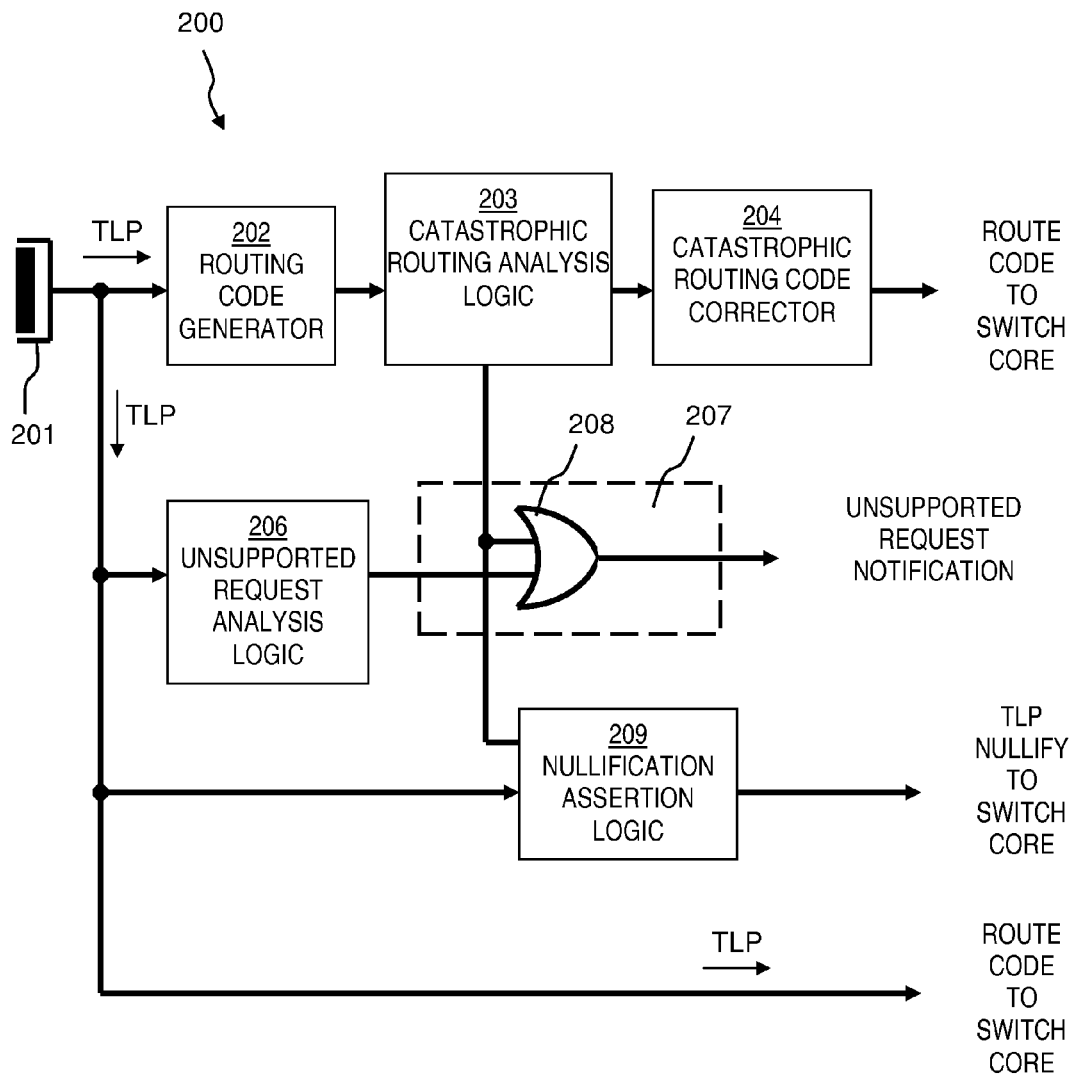
FIG. 2 illustrates a logical block diagram of a routing device for a multi-port switching device that can handle and correct catastrophic switch routing errors in accordance with an embodiment of the present invention.

Referring now to FIG. 2, a block diagram of routing device 200 is illustrated. Routing device 200 is enabled to handle catastrophic routing in a PCI Express switch. In one embodiment of the present invention, device 200 resides in a PCI Express switch and is associated with a port in the switch.

In one embodiment, a transaction layer packet, or TLP, is received at the associated port and is held in register 201. Register 201 is sufficiently large enough to hold the entire TLP header and enables the TLP header to be read to extract destination address information.

When a TLP arrives from an ingress port at register 201, its header is read at routing code generator 202. Routing code generator 202, in one embodiment of the present invention, performs a base address matching operation to determine which egress port to send the TLP.

In base address matching, for a TLP to be routed to a downstream external device by the switch, the address in the packet header must equal or lie between the base address and the limit address assigned to the port that is connected to the device. Each port in a PCI Express switch is connected to only one external device but an external device can be another switch or a bridge connected to additional devices.

Routing code generator 202 assigns a routing code to the TLP that informs the switch core of the PCI Express switch of the destination port. The assigned code, in one embodiment, comprises a number of binary bits that indicate the proper port. In a switch with one upstream and three downstream ports, for example, the binary code in one embodiment comprises three bits. If no bits are set (0b000), the switch core directs the TLP to the upstream port. If the first bit is set (0b001), the TLP is directed to first downstream port. If the second bit is set (0b010), the TLP is directed to second downstream port. If the first and second bits are set (0b011), the TLP is directed to third downstream port. If all bits are set (0b111), the TLP is directed to all ports in a "broadcast" routing. However, in this example, there is no defined response to bit codes set to conditions other than those listed here, such as (0b100) for example. It is noted here that other embodiments of the present invention can use different routing code formats.

When the routing code is generated, it is analyzed to determine whether a catastrophic routing condition exists by catastrophic routing analysis logic 203 (step 104 in FIG. 1). In this embodiment, the routing code bits are set based on the results of the base address matching performed by routing code generator 202. The normal, and PCI Express-defined, routings are dealt with by directing the TLP either to one or to all of the egress ports in the PCI Express switch. In the case of more than one, but not all, ports being selected as destination ports, the switch core has no defined method for dealing with non-defined routing code settings. In this case, catastrophic routing analysis logic 203 determines that a routing code is either set to a proper configuration or represents a catastrophic routing condition. The catastrophic routing condition holds the potential for a catastrophic failure of the switching operation.

When a catastrophic routing condition is represented in the routing code, catastrophic routing analysis logic device 203 also determines whether the potentially catastrophic routing condition is correctable (step 105 in FIG. 1). In one embodiment, correcting code means that code which would otherwise direct a TLP to a device at which it would wreak havoc, is corrected to direct the TLP internally to the switch, so that the TLP is discarded without interfering with other TLP traffic. In another embodiment, the code is corrected to direct the TLP to its intended target.

Continuing with FIG. 2, if catastrophic routing analysis logic 203 determines that the routing code is correctable (step 103 in FIG. 1), it is corrected by catastrophic routing code corrector 204. Catastrophic routing code corrector 204 is logic that executes the corrections exemplified above (step 108 in FIG. 1). When the routing code is corrected, the corrected routing code is executed and the TLP associated with the routing code is forwarded to the switch core of the PCI Express switch for further forwarding to the ultimate destination of the TLP.

At the same time that route code generation and catastrophic routing analysis are taking place, analysis for an unsupported request is accomplished at 206. One unsupported request determination can arise when the target address of a TLP can find no match in the any of the port addresses. An example of an unsupported target request is a destination address that lies above the limit address of one port but below the base address of the next higher port. Handling of an unsupported request is defined in the PCI Express standard.

In one embodiment of the present invention, if an unsupported request determination is made by unsupported request analysis logic 206, the unsupported request (UR) flag is set and sent to unsupported request notification logic 207. The unsupported request flag is then forwarded to the switch core to be furthered to the root complex (step 107 in FIG. 1). In this embodiment of the present invention, unsupported request notification logic 207 is implemented as a logical OR gate 208. The unsupported request flag is one input to logical OR gate 207; the other input is the catastrophic routing analysis flag set by catastrophic routing analysis logic 203. By combining the two outputs in OR gate 207, both a TLP with a recognized unsupportable address and a TLP with an address resulting in a catastrophic routing get handled in the same manner, as an unsupported request. In this fashion, in this embodiment, a potentially catastrophic route is handled in a graceful manner, meaning that it does not disrupt switching operations, and an indication is made to the system management that an unsupportable request has occurred.

Unsupported request notification logic 207 is shown here as a functional representation. It is implemented as a logical OR gate 208 in this embodiment of the present invention. In another embodiment, the function unsupported request notification logic 207 is accomplished by a means other than an OR gate. In yet another embodiment, a catastrophic routing analysis directs a notification of a catastrophic routing condition to the root complex by another means.

Referring still to FIG. 2, nullification assertion logic 209 is enabled to determine whether the communication packet is to be nullified. Nullification, it is noted, is described in the PCI Express specification. In one embodiment, nullification means that the nullified packet no longer occupies a register in the switch and the switch resources are freed up for other operations. Nullification assertion logic 209 sends an indication to the switch core that indicates whether a communication packet has been nullified. In this embodiment of the present invention, nullification assertion logic 209 takes one input from catastrophic routing analysis logic 203 and one input from the packet. If catastrophic routing analysis logic 203 indicates that the routing is a catastrophic routing condition or if the packet is otherwise determined to be nullified, nullification assertion logic 209 sends a nullification flag, associated with the communication packet, to the switch core (step 106 in FIG. 1). The nullification prevents the execution of the catastrophic route.

In one embodiment routing code generator 202, catastrophic routing analysis logic 203, catastrophic routing code corrector 204, unsupported request analysis logic 206, unsupported request notification logic 207 and nullification assertion logic are circuitry, implemented in a single integrated circuit device for performing the indicated functionality. Moreover, routing code generator 202, catastrophic routing analysis logic 203, catastrophic routing code corrector 204, unsupported request analysis logic 206, can include software and/or firmware for performing the indicated functionality.

Figure 3:
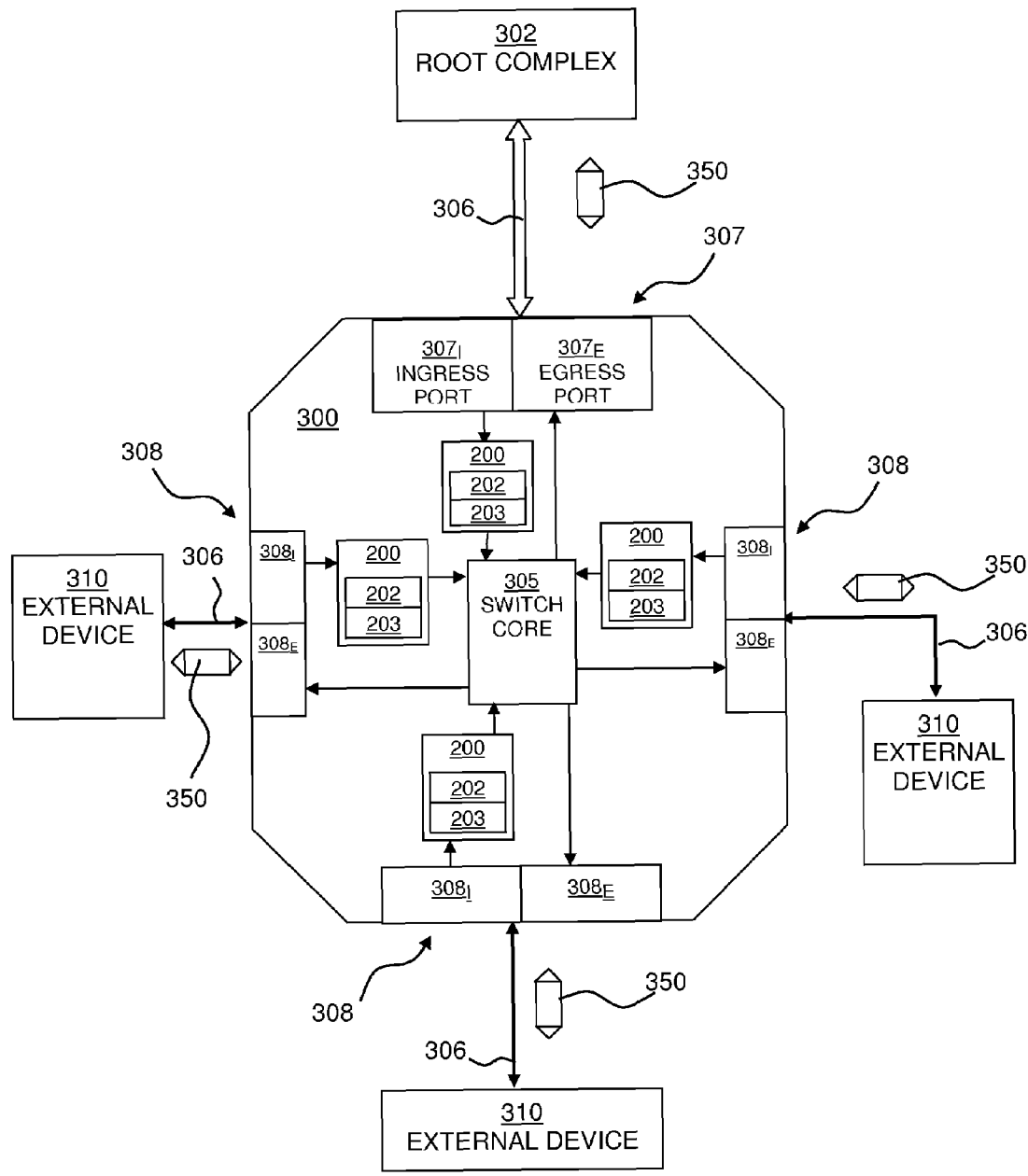
FIG. 3 illustrates a block diagram of a switching device in accordance with an embodiment of the present invention.

Now referring to FIG. 3, a block diagram of a switching device 300 is shown. In this embodiment of the present invention, the switching device is a PCI Express switch that routes packet communications 350 between root complex 302 and external devices 310 using routing device 200 of FIG. 2 at each port to facilitate communication. In another embodiment, routing device 200 is centrally implemented with switch core 305. Each port 307 in switching device 300 is characterized by an ingress port $307_I$ for receiving communication packets and an egress port $307_E$ for transmitting communication packets.

In one embodiment of the present invention, switching device 300 employs routing device 200 that contains routing code generator 202 and catastrophic routing analysis logic 203. Routing device 200 is electrically connected to an ingress port $307_I$ and the switch core 305. Switching device 300 communicates with external devices 310 via PCI Express links 306. As discussed previously, the term PCI Express, as used in the present invention includes devices, protocols, operations that conform to the requirements of the PCI Express Base Specification.

In the present embodiment, as illustrated in FIG. 3, switching device 300 is implemented as a four port switch. In another embodiment, switching device 300 includes 15 downstream ports 308 and one upstream port 307. Upstream port 307 further includes ingress terminal $307_I$ and egress terminal $307_E$. Ingress terminal $307_I$ is an input terminal for receiving an incoming PCI Express communication packet from root complex 302. Egress terminal $307_E$ is an upstream output port for sending out a communication packet routed through switching device 300 to root complex 302 or to another switching device located upstream.

Downstream ports 308 each include an ingress terminal $308_I$ and an egress terminal $308_E$ that are electrically coupled to switch core 305. Downstream ingress terminal $308_I$ is used to receive communication packet 350 from external devices 310 and downstream egress terminals $308_E$ send out communication packets to external devices 310. It is noted that, when external devices 310 are electrically connected to switching device 300, external devices 310 can send and receive PCI Express packets, through switching device 300 over PCI Express links 306, to each other without entailing upstream, root complex, time.

At upstream port 307, the input terminal of routing device 200 is electrically connected to upstream ingress terminal $307_I$ and the output terminal of routing device 200 is electrically connected to switch core 305. The output of the switch is electrically connected to egress terminal $307_E$ of upstream port 307. Similarly, at each downstream port 308, the input terminal of routing device 200 is electrically connected to downstream ingress terminal $308_I$ and the output terminal of routing device 200 is electrically connected to a terminal of switch core 305. The output of that switch is electrically connected to egress terminal $308_E$ of downstream port 308.

In one embodiment of the present invention, routing device 200, and its array of base address registers and control logic, is replicated at every port in switching device 300. In an alternative embodiment, however, a single implementation of the elements of routing device 200 is located with the switch core 305. In another embodiment, more than one implementation of the elements of routing device 200 is implemented, though not at every port in the switching device.

Referring still to FIG. 3, a communication packet 350 may be received at switching device 300 at upstream port 307 or at any downstream port 308. In the present embodiment, a communication packet, or TLP, 350 can be a data or other packet that is in compliance with the PCI Express standard. External devices 310 can be PCI Express devices or bridges to other types of devices. Upon receiving communication packet 350, routing device 200 determines whether the destination address contained in communication packet 350 falls within the address range contained in any of the base address registers in the array of base address registers 101. If the target address contained in communication packet 350 is within the range of any of the base address registers of routing code generator 202, switching device 300 will forward the communication packet 350 to the port named in the base address register whose address range encompasses the target address.

In the present embodiment, switching device 300 is a single Integrated Circuit (IC) device that is implemented in a single semiconductor chip on which routing functions and logic of switching device 300 are implemented. This includes registers, comparators, multiplexers and connection links described above.

Figure 4:
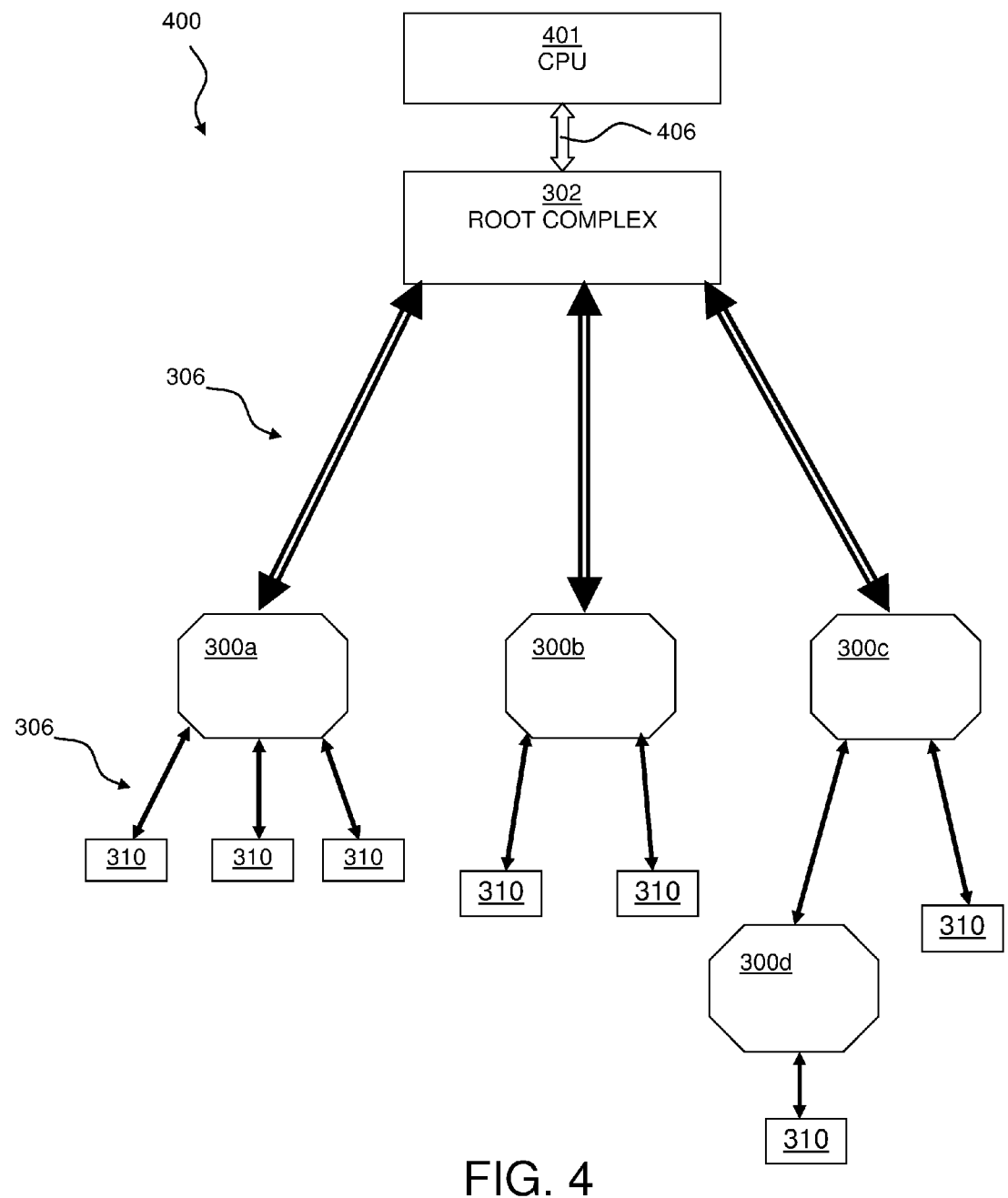
FIG. 4 illustrates a schematic diagram of a PCI Express system that includes the switching device of FIG. 3 and external devices in accordance with an embodiment of the present invention.

Now referring to FIG. 4, a schematic diagram of a PCI Express system 400 is shown that uses switching device 300 to connect external devices 310 with root complex 302 and with each other. PCI Express system 400 is a communication system which is typically found in a computing system that includes a Central Processing Unit (CPU) 401, a root complex 302, one or more switching devices 300 and one or more external devices 310.

The elements of PCI Express system 400 interconnected by PCI Express link 306 are the root complex 302 and the switching device 300. Switching devices 300 are connected by PCI Express links 306 to external devices 310. CPU 401 is electronically connected to root complex 302 but the link 406 between them is not, in this embodiment, a PCI Express link. Link 406 can be a parallel system bus or another communication bus. The heart of PCI Express system 400 is root complex 302. Root complex 302 is connected to PCI Express switching device 300 by PCI Express link 306. External devices 310 communicate to root complex 302, and thus CPU 401, via PCI Express links 306 and switching device 300. In PCI Express system 400, external devices 310 can independently communicate peer-to-peer with each other directly via switching device 300. PCI Express system 400 uses communication packets 350 to communicate to root complex 302, switching device 300, and external devices 310 connected thereto. Communication packets can be generated by the root complex 302, switching device 300, or external devices 310.

Referring further to FIG. 4, the controller of PCI Express communications in system 400 is either CPU 401 or root complex 302. In the point-to-point diagram shown in FIG. 4, CPU 401 can communicate to any of the external devices 310, even if the communication pathway between CPU 401 and an external device 310 includes PCI Express serial switch 300c and PCI Express serial switch 300d in the sequential relationship shown. CPU 401 can open up communication with that external device 310 via switching devices 300. CPU 401, through root complex 302, controls the operations of switching devices 300 and the PCI Express links 306 with external devices 310. Root complex 302 detects and initializes external devices 310, and controls PCI Express link 306 by default. Root complex 302 can retrieve information from external device 310. Upon receiving an instruction from root complex 302, switching devices 300 can route communications directly between external devices 310. External devices 310 can communicate with one another independently and in a peer-to-peer fashion without a master-slave control of either switching devices 300 or root complex 302.

External devices 310, it is noted, can be either endpoint devices or other switching devices such as switching devices 300, such as shown by switching devices 300c and 300d. Endpoint devices can be, for example, printers, digital cameras, add-in cards, USB memory sticks, etc. Other switching devices 300 are often not the end users of communication packets 350 sent to them; they forward the packets to other endpoint devices 310 to which they are connected. Each external device 310 is assigned to a base address and a limit address. These base addresses are loaded and stored in a global address map and are retrieved as needed by root complex 302 or CPU 401. Root complex 302 maps these base and limit addresses to the arrays of base address registers in routing devices 200. The base address contained in each base address register in the arrays of base address registers defines the I/O locations, device locations, starting points and memory addresses that each external device 310 has been allocated in the global address map.

Referring again to FIG. 4, PCI Express link 306 connects external devices 310 to root complex 302 so that the CPU 401, via root complex 302, can communicate with them. Each PCI Express link 306 is composed of one or more lanes, and each lane is capable of transmitting packets in both directions at once. This full-duplex communication is possible because each lane is itself composed of one pair of signals: send and receive.

Referring still to FIG. 4, upon the power-up and enumeration process, the operating system, via root complex 302, interrogates the entire PCI Express system 400 by traversing through system topology and locates all external devices 310 that are connected to the switching device 300. After the configuration process is complete, each receiver interface of each external device 310 is prepared to receive and transmit new communication packet 350. A transaction layer packet (TLP) can move from one PCI Express link 306 to another PCI Express link 306, using routing information contained in its header.

Referring still to FIG. 4, as a new communication packet 350, in the form of a transaction layer packet (TLP), arrives at ports 307 or 308, switching device 300 checks for errors then determines whether to accept the traffic and use it internally, forward the traffic to the appropriate port 308, or reject the traffic because switching device 300 is neither the intended target nor an interface to it.

If switching device 300 is not correctly in the path of communication packet 350, the packet is processed subject to the rules for ordering and flow control for that port. If the target address of transaction layer packet 350 finds a misconfigured or mis-programmed set of base address registers in a switch, embodiments of the present invention are enabled to prevent a catastrophic routing condition that results from causing a disruption of switch operations.

In one embodiment of the present invention where PCI Express system has more than one switching device 300 connected to it, to facilitate communications between two external devices 310 in different switching devices 300, communication packet 350 traverses from the originating external device 310, connected to one switching device 300 all the way up to the lowest common switch point. New communication packet 350 is then traverses down to the destination external device 310. When the source and target reside on different segments of PCI Express link 306, communication packet 350 must be routed up toward root complex 302 to the segment of PCI Express link 306 where the base address ranges of the source and the target external devices 310 intersect, and then routed down to the target external device 310. As a result, address based routing exploits the shortest paths that exist in a switched-packet interconnect fabric.

It is noted here that a base address register, as referred to in this description, can include a limit address and a port name or number. When a matching base address is determined by the base address matching logic circuit, the associated port identifier is sent to the switch core of the switching device in the form of a routing code. The routing code is used to forward the communication packet to the correct port.

It is noted here that this discussion of embodiments of the present invention refers to use in a Peripheral Component Interface Express (PCIe) switch operating as part of a PCI Express bus. However, implementation of embodiments of the present invention is not limited to such applications.

A method and apparatus have been disclosed herein for detecting and handling catastrophic routing conditions in a PCI Express switch such that switch operations are not disrupted. An embodiment of the method also logs such occurrences by the statistics mechanisms designed into the switch and aids in alleviating or eliminating mis-programming or mis-configuring PCI Express switches.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method for handling catastrophic routing errors in a packet switching device that includes a plurality of ports and a plurality of base address registers, the method comprising:
    analyzing a routing code in a communication packet received at the packet switching device to determine if a catastrophic routing condition exists in the routing code, wherein the catastrophic routing condition exists when the routing code is generated from matching a communication packet target address associated with the communication packet to more than one base address register of the plurality of base address registers;
    executing the routing of the communication packet associated with the routing code if the catastrophic routing condition does not exist in the routing code; and
    preventing the execution of the routing of the communication packet, without restarting the packet switching device, if the catastrophic routing condition does exist in the routing code.

2. The method described in claim 1, wherein the packet switching device is a PCI Express switch.

3. A method for handling catastrophic routing errors in a packet switching device that includes a plurality of ports and a plurality of base address registers, the method comprising:
    analyzing a routing code in a communication packet received at the packet switching device to determine if a catastrophic routing condition exists in the routing code, wherein the catastrophic routing condition exists if the routing code directs the routing of the communication packet to more than one, but not all, of the plurality of ports;
    executing the routing of the communication packet associated with the routing code if the catastrophic routing condition does not exist in the routing code; and
    preventing the execution of the routing of the communication packet, without restarting the packet switching device, if the catastrophic routing condition does exist in the routing code.

4. The method described in claim 3, wherein the packet switching device is a PCI Express switch.

5. The method described in claim 2, further comprising designating the communication packet associated with the catastrophic routing condition as an unsupported request.

6. The method described in claim 2, further comprising nullifying the communication packet associated with the catastrophic routing condition.

7. The method described in claim 2, wherein preventing the execution of the routing of the communication packet further comprises:
    determining whether the catastrophic routing condition is correctable;
    nullifying the routing of the communication packet if the catastrophic routing condition is not correctable;
    correcting the routing code if the catastrophic routing condition is correctable; and
    executing the corrected routing code.

8. The method described in claim 7, further comprising notifying the root complex if the catastrophic routing condition is not correctable.

9. The method described in claim 2, wherein all routing codes generated by the packet switching device are analyzed.

10. The method described in claim 2, wherein executing the routing code comprises sending the routing to a switch core for routing to a port.

11. A method for routing a communication packet in a switch that includes a plurality of ports and a plurality of base address registers, the method comprising:
    receiving the communication packet at one of the plurality of ports;
    generating a routing code for the communication packet;
    analyzing the routing code to determine if a catastrophic routing condition exists in the routing code, wherein the catastrophic routing condition exists when the routing code is generated from matching a communication packet target address associated with the communication packet to more than one base address register of the plurality of base address registers;
    if the catastrophic routing condition does not exist in the routing code, executing the routing of the communication packet;
    if the catastrophic routing condition does exist in the routing code, determining if the catastrophic routing condition is correctable;
    if the catastrophic routing condition is not correctable, preventing the execution of the routing of the communication by nullifying the routing of the communication packet, without restarting the switch;
    if the catastrophic routing condition is correctable, correcting the routing code to generate a corrected routing code; and executing the routing of the communication packet using the corrected routing code.

12. The method described in claim 11, wherein the switch is a multi-port PCI Express switch.

13. A method for routing a communication packet in a switch that includes a plurality of ports and a plurality of base address registers, the method comprising:
    receiving the communication packet at one of the plurality of ports;
    generating a routing code for the communication packet;
    analyzing the routing code to determine if a catastrophic routing condition exists in the routing code, wherein the catastrophic routing condition exists if the routing code directs the routing of the communication packet to more than one, but not all, of the plurality of ports;
    if the catastrophic routing condition does not exist in the routing code, executing the routing of the communication packet;
    if the catastrophic routing condition does exist in the routing code, determining if the catastrophic routing condition is correctable;
        if the catastrophic routing condition is not correctable, preventing the execution of the routing of the communication by nullifying the routing of the communication packet, without restarting the switch;
        if the catastrophic routing condition is correctable, correcting the routing code to generate a corrected routing code; and
        executing the routing of the communication packet using the corrected routing code.

14. The method described in claim 13, wherein the switch is a multi-port PCI Express switch.

15. The method described in claim 11, wherein nullifying the routing of the communication packet comprises notifying the root complex of the nullification.

16. A routing device in a switch enabled to handle catastrophic switch routing errors, the routing device comprising:
    a routing code generator for generating a routing code for a communication packet;
    catastrophic routing analysis logic coupled to the routing code generator and enabled to analyze the routing code to determine if a catastrophic routing condition exists in the routing code, wherein the switch comprises a plurality of ports and the catastrophic routing condition exists if the routing code directs the routing of the communication packet to more than one, but not all, of the plurality of ports; and
    a catastrophic routing code corrector coupled to the catastrophic routing analysis logic and enabled to correct the routing code if the catastrophic routing condition exists, without restarting the switch.

17. The routing device described in claim 16, further comprising:
    unsupported request analysis logic enabled to identify an unsupported request; and
    unsupported request notification logic coupled to the unsupported request analysis logic and to the catastrophic routing analysis logic and enabled to indicate the unsupported request if the catastrophic routing condition is determined or if the unsupported request is identified.

18. The routing device described in claim 17, wherein the unsupported request notification logic comprises a logical OR gate.

19. A routing device in a switch enabled to handle catastrophic switch routing errors, the routing device comprising:
    a routing code generator for generating a routing code for a communication packet;
    catastrophic routing analysis logic coupled to the routing code generator and enabled to analyze the routing code to determine if a catastrophic routing condition exists in the routing code, wherein the switch comprises a plurality of base address registers and the catastrophic routing condition exists when the routing code is generated from matching a communication packet target address associated with the communication packet to more than one base address register of the plurality of base address registers; and
    a catastrophic routing code corrector coupled to the catastrophic routing analysis logic and enabled to correct the routing code if the catastrophic routing condition exists, without restarting the switch.

20. The routing device described in claim 17, further comprising nullification assertion logic coupled to the catastrophic routing analysis logic and enabled to assert nullification of the communication packet.

21. The routing device described in claim 17, wherein the unsupported request analysis logic is enabled to log the occurrence of the unsupported request.

22. The routing device described in claim 16, wherein the communication packet is a transaction layer packet that conforms to the standards for PCI Express.

23. The routing device described in claim 16 wherein the routing device is implemented in a PCI Express multiport switch that is a single-chip integrated circuit device.

24. A multi-port PCI Express packet switching device, enabled to prevent catastrophic routing of a communication packet, the multi-port PCI Express packet switching device comprising:
    a plurality of communication ports for receiving and sending a communication packet, each of the plurality of communication ports comprising an ingress port and an egress port;
    a plurality of routing devices, each of the plurality of routing devices coupled to each ingress port, each of the plurality of routing devices comprising a routing code generator for generating a routing code, catastrophic routing analysis logic for determining if a catastrophic routing condition exists in the routing code, and logic for routing the communication packet when the catastrophic routing condition does not exist and for preventing routing of the communication packet when the catastrophic routing condition does exist, without restarting the multi-port PCI Express packet switching device, wherein the catastrophic routing condition exists if the routing code directs the routing of the communication packet to more than one, but not all, of the plurality of communication ports; and
    a switch core, coupled to each egress port and to each of the plurality of routing devices, the switch core enabled to execute the routing code.

25. A multi-port PCI Express packet switching device, enabled to prevent catastrophic routing of a communication packet, the multi-port PCI Express packet switching device comprising:
    a plurality of base address registers;
    a plurality of communication ports for receiving and sending a communication packet, each of the plurality of communication ports comprising an ingress port and an egress port;
    a plurality of routing devices, each of the plurality of routing devices coupled to each ingress port, each of the plurality of routing devices comprising a routing code generator for generating a routing code, catastrophic routing analysis logic for determining if a catastrophic routing condition exists in the routing code, and logic for routing the communication packet when the catastrophic routing condition does not exist and for preventing routing of the communication packet when the catastrophic routing condition does exist, without restarting the multi-port PCI Express packet switching device, wherein the catastrophic routing condition exists when the routing code is generated from matching a communication packet target address associated with the communication packet to more than one base address register of the plurality of base address registers; and a switch core, coupled to each egress port and to each of the plurality of routing devices, the switch core enabled to execute the routing code.

26. The multi-port packet switching device described in claim 24 wherein the catastrophic routing analysis logic is enabled for determining if the catastrophic routing condition is correctable or if the catastrophic routing condition is not correctable.

27. The multi-port packet switching device described in claim 26, wherein each of the plurality of routing devices further comprises a catastrophic routing code corrector coupled to the catastrophic routing analysis logic, the catastrophic routing code corrector enabled to correct the routing code and to generate a corrected routing code if the catastrophic routing condition exists and the catastrophic routing condition is correctable, the routing device operable to execute the routing of the communication packet using the corrected routing code and prevent execution of the routing of the communication packet if the catastrophic routing condition is not correctable.

28. The multi-port packet switching device described in claim 27, wherein the routing device further comprises:
   unsupported request analysis logic for identifying an unsupported request; and
   unsupported request notification logic coupled to the unsupported request analysis logic and to the catastrophic routing analysis logic and enabled to indicate an unsupported request if the catastrophic routing condition is determined to exist or if the unsupported request is identified.

* * * * *